United States Patent
Shinomoto et al.

(10) Patent No.: US 10,113,784 B2
(45) Date of Patent: Oct. 30, 2018

(54) DIRECT-CURRENT POWER SUPPLY DEVICE, MOTOR DRIVING DEVICE, AIR CONDITIONER, AND REFRIGERATOR

(71) Applicant: Mitsubishi Electric Corporation, Tokyo (JP)

(72) Inventors: Yosuke Shinomoto, Tokyo (JP); Kazunori Hatakeyama, Tokyo (JP); Shota Kamiya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 125 days.

(21) Appl. No.: 15/026,628

(22) PCT Filed: Oct. 15, 2014

(86) PCT No.: PCT/JP2014/077468
§ 371 (c)(1),
(2) Date: Apr. 1, 2016

(87) PCT Pub. No.: WO2015/056721
PCT Pub. Date: Apr. 23, 2015

(65) Prior Publication Data
US 2016/0245571 A1 Aug. 25, 2016

(30) Foreign Application Priority Data
Oct. 18, 2013 (WO) .................. PCT/JP2013/078311

(51) Int. Cl.
*H02P 27/08* (2006.01)
*F25B 49/02* (2006.01)
(Continued)

(52) U.S. Cl.
CPC ............ *F25B 49/025* (2013.01); *F25B 13/00* (2013.01); *F25B 31/02* (2013.01); *F25D 11/00* (2013.01);
(Continued)

(58) Field of Classification Search
CPC ......... H02P 27/08; F25B 49/025; F25B 13/00
(Continued)

(56) References Cited

U.S. PATENT DOCUMENTS 5,430,639 A 7/1995 Takahashi
5,572,415 A * 11/1996 Mohan ...................... G05F 3/24
363/126
(Continued)

FOREIGN PATENT DOCUMENTS

JP 06-121528 A 4/1994
JP 06-253540 A 9/1994
(Continued)

OTHER PUBLICATIONS

Extended European Search Report dated May 8, 2017 for the corresponding EP application No. 14853836.6.
(Continued)

*Primary Examiner* — Kawing Chan
(74) *Attorney, Agent, or Firm* — Posz Law Group, PLC

(57) ABSTRACT

A direct-current power supply device includes a switching unit constituted by a first switching element and a second switching element and a control unit that controls the operations of the first witching element and the second switching element. The switching unit has a first mode in which on-duty is a first value and a second mode in which the on-duty is a second value larger than the first value. When transitioning the switching unit from the first mode to the second mode, the control unit controls the switching unit such that the time until the on-duty reaches the second value is equal to or longer than a fixed time and controls, after the on-duty reaches the second value, an operation cycle of the switching unit to extend the operation cycle.

18 Claims, 11 Drawing Sheets

(51) Int. Cl.
    *H02M 7/06*       (2006.01)
    *H02M 1/36*       (2007.01)
    *H02M 3/158*      (2006.01)
    *H02M 7/5387*     (2007.01)
    *F25B 13/00*      (2006.01)
    *F25B 31/02*      (2006.01)
    *F25D 11/00*      (2006.01)
    *H02M 1/00*      (2006.01)

(52) U.S. Cl.
    CPC ............ *H02M 1/36* (2013.01); *H02M 3/158* (2013.01); *H02M 7/06* (2013.01); *H02M 7/5387* (2013.01); *H02P 27/08* (2013.01); *F25B 2600/024* (2013.01); *F25B 2700/151* (2013.01); *H02M 2001/007* (2013.01)

(58) Field of Classification Search
    USPC .......................................................... 318/3
    See application file for complete search history.

(56) References Cited

U.S. PATENT DOCUMENTS

| | | | | |
|---|---|---|---|---|
| 5,764,037 | A * | 6/1998 | Jacobs | H02M 1/4208 323/222 |
| 6,031,739 | A * | 2/2000 | He | H02M 1/4216 323/222 |
| 6,181,583 | B1 * | 1/2001 | Okui | H02M 1/4208 363/45 |
| 6,556,462 | B1 * | 4/2003 | Steigerwald | H02M 1/4208 363/89 |
| 7,274,579 | B2 * | 9/2007 | Ueda | H02M 5/458 363/125 |
| 7,576,299 | B2 * | 8/2009 | Rossetto | B23K 9/1018 219/130.1 |
| 8,405,327 | B2 * | 3/2013 | Liang | H02P 25/092 307/151 |
| 8,823,303 | B2 * | 9/2014 | Shinomoto | H02M 1/4225 318/400.29 |
| 2005/0243894 | A1 * | 11/2005 | Chen | H02M 1/44 375/139 |
| 2007/0107474 | A1 * | 5/2007 | Jun | D06F 37/304 68/12.23 |
| 2011/0069515 | A1 * | 3/2011 | Liang | H02M 1/4208 363/126 |
| 2012/0235611 | A1 * | 9/2012 | Kuwabara | H02M 1/08 318/400.17 |
| 2012/0274299 | A1 * | 11/2012 | Chang | H02M 1/32 323/283 |
| 2014/0376276 | A1 * | 12/2014 | Yamadaya | H02M 3/3376 363/21.02 |

FOREIGN PATENT DOCUMENTS

| | | |
|---|---|---|
| JP | 07-177742 A | 7/1995 |
| JP | 2000-278955 A | 10/2000 |
| JP | 2007-288968 A | 11/2007 |
| JP | 2008-012586 A | 1/2008 |
| JP | 2008-295228 A | 12/2008 |
| JP | 2009-050109 A | 3/2009 |
| JP | 2010-213473 A | 9/2010 |
| JP | 2013-110839 A | 6/2013 |
| KR | 10-2005-0104148 A | 11/2005 |
| WO | 2004/071703 A1 | 8/2004 |
| WO | 2013/057857 A1 | 4/2013 |
| WO | 2014/207824 A1 | 12/2014 |
| WO | 2015/033437 A1 | 3/2015 |
| WO | 2015/063869 A1 | 5/2015 |

OTHER PUBLICATIONS

Miftakhutdinov R. et al., "Advanced Control Circuit for Intermediate Bus Converter," IEEE, 2008, pp. 1515-1521, XP31253451.
International Search Report of the International Searching Authority dated Dec. 16, 2014 for the corresponding international application No. PCT/JP2014/077468 (and English translation).
Office Action dated Nov. 3, 2017 issued in corresponding KR patent application No. 10-2016-7012406 (and English translation).
Office Action dated Sep. 5, 2017 issued in corresponding CN patent application No. 201480055351.0 (and English translation).
Office action dated Jan. 15, 2018 issued in corresponding Korean patent application No. 10-2016-7012406 (and English machine translation thereof).

* cited by examiner

DIRECT-CURRENT POWER SUPPLY DEVICE, MOTOR DRIVING DEVICE, AIR CONDITIONER, AND REFRIGERATOR

CROSS REFERENCE TO RELATED APPLICATIONS

This application is a U.S. national stage application of International patent application No. PCT/JP2014/077468 filed on Oct. 15, 2014, which claims priority to International patent application No. PCT/JP2013/078311 filed on Oct. 18, 2013, the disclosures of which are incorporated herein by reference.

TECHNICAL FIELD

The present invention relates to a direct-current power supply device, a motor driving device, an air conditioner, and a refrigerator.

BACKGROUND

There has been described a technology for standardizing 200 volts and 400 volts by comparing a direct-current voltage, which is connected to a commercial three-phase power supply and rectified, with a reference value and operating or stopping a first switching element and a second switching element (e.g., Patent Literature 1). There has been described a technology for storing energy in a reactor and boosting a voltage by continuously setting a period in which a first switching element and a second switching element are simultaneously turned on and off, or simultaneously turned on, a period in which only one of the first switching element and the second switching element is turned on, a period in which the first switching element and the second switching element are simultaneously turned on, and a period in which only the other of the first switching element and the second switching element is turned on (e.g., Patent Literature 2).

Concerning a commercial single-phase power supply, there has been described a technology for making it possible to control full-wave rectification and double-voltage rectification and control an input voltage into a wide variety of output voltages by alternately switching two switching elements connected in series (e.g., Patent Literature 3).

Further, there has been described a technology in which boosting chopper units configured by switching elements and reactors inserted in respective phases are connected to a neutral point of a star connecting wire of a multi-phase power supply and the switching elements operate, whereby harmonics are suppressed (e.g., Patent Literature 4).

There have been disclosed a technology for controlling an ignition angle of a thyristor to suppress an inrush current (a rush current) into a capacitor (e.g., Patent Literature 5) and a technology for increasing a conduction time of a switching element as time elapses (e.g., Patent Literature 6) in a power converting device.

PATENT LITERATURE

Patent Literature 1: Japanese Patent Application Laid-Open No. 2008-12586
Patent Literature 2: Japanese Patent Application Laid-Open No. 2009-50109
Patent Literature 3: Japanese Patent Application Laid-Open No. 2000-278955
Patent Literature 4: Japanese Patent Application Laid-Open No. H6-253540
Patent Literature 5: Japanese Patent Application Laid-Open No. 2007-288968
Patent Literature 6: Japanese Patent Application Laid-Open No. 2010-213473

In the power converting devices described in Patent Literatures 1 to 4, output voltages higher than power supply voltages can be obtained. All of the output voltages are obtained by operations by the switching elements. However, there is no description concerning a suppressing method for an inrush current due to an operation start of the switching elements.

Patent Literatures 5 and 6 disclose a method of controlling the inrush current into the capacitor by limiting an initial charging current through the ignition angle control of the thyristor or by increasing the conduction time of the switching element as time elapses. However, the technologies described in Patent Literatures 5 and 6 are suppressing methods for an inrush current of initial charging to the capacitor. There is a problem in that inrush currents during switching from a full-wave rectification operation to a double voltage operation and during restoration from a momentary stop cannot be suppressed.

SUMMARY

The present invention has been devised in view of the above and it is an object of the present invention to obtain a direct-current power supply device capable of suppressing an inrush current that occurs during an operation start of a switching element.

In order to solve the aforementioned problems, a direct-current power supply device according to one aspect of the present invention is so constructed as to include a switching unit including a first switching element and a second switching element and having a first mode in which on-duty of the first switching element and the second switching element is a first value and a second mode in which the on-duty of the first switching element and the second switching element is a second value larger than the first value, and a switching control unit that, when transitioning the switching unit from the first mode to the second mode, controls the first switching element and the second switching element such that the time until the on-duty reaches the second value is equal to or longer than a fixed time and controls, after the on-duty reaches the second value, an operation cycle of the first switching element and the second switching element so as to extend the operation cycle.

A direct-current power supply device, a motor driving device, an air conditioner, and a refrigerator according to the present invention attain an effect that it is possible to suppress an inrush current that occurs during an operation start of a switching element.

DETAILED DESCRIPTION

Embodiments of a direct-current power supply device, a motor driving device, an air conditioner, and a refrigerator according to the present invention are explained in detail below with reference to the drawings. Note that the present invention is not limited by the embodiments.

First Embodiment

Figure 1:
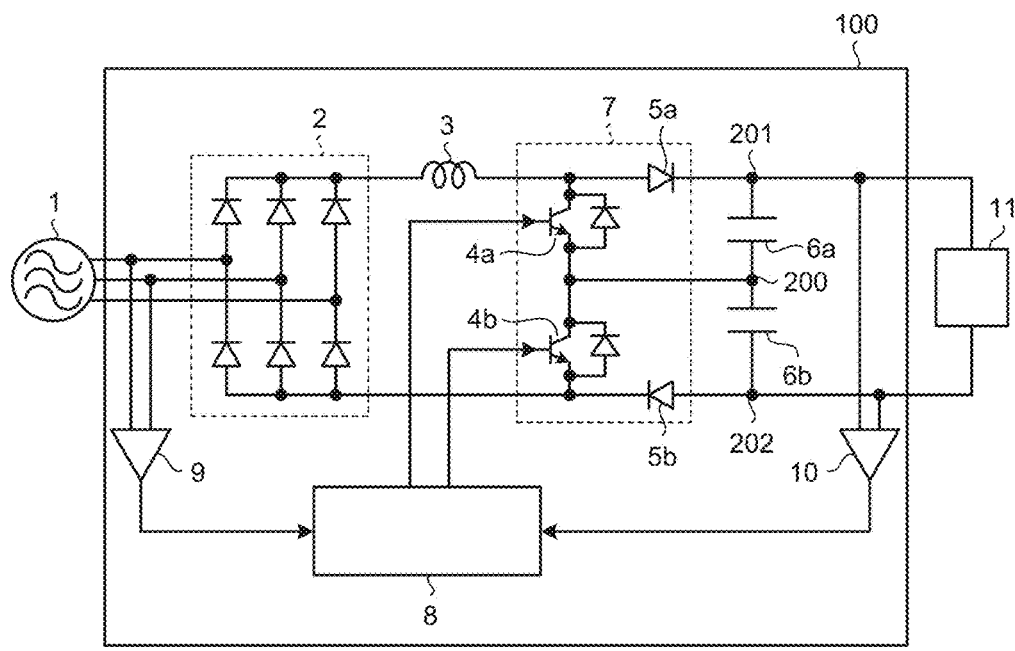
FIG. 1 is a circuit block diagram showing a configuration example of a direct-current power supply device according to a first embodiment.

FIG. 1 is a circuit block diagram showing a configuration example of a first embodiment of a direct-current power supply device 100 according to the present invention. The direct-current power supply device 100 of this embodiment is an AC-DC power conversion device, and converts a three-phase alternating current supplied from an alternating-current power supply 1 into a direct current and supplies the direct current to a load 11. The load 11 can be any load as long as the load performs power consumption with a direct current. As the load 11, for example, an inverter load that drives a motor of a compressor used in an apparatus to which a refrigeration cycle is applied is assumed. Examples of the apparatus to which the refrigeration cycle is applied include an air conditioner, a freezer, a washer drier, a refrigerator, a dehumidifier, a heat-pump type water heater, and a showcase. The load 11 is not limited to the load of the apparatus to which the refrigeration cycle is applied and can be a load in an apparatus such as a vacuum cleaner, a fan motor, a ventilation fan, a hand drier, an electromagnetic induction heating cooker, and the like.

The direct-current power supply device 100 includes a rectifier circuit (a rectifier) 2 that rectifies a three-phase alternating current, a reactor 3 connected to an output side of the rectifier circuit 2, a first capacitor 6a and a second capacitor 6b connected in series between output terminals to the load 11, a switching unit 7 that selectively charges one or both of the first capacitor 6a and the second capacitor 6b, a control unit 8 (switching control unit) that controls the switching unit 7, a power-supply-voltage detecting unit 9 that detects a voltage of a three-phase alternating current, and a direct-current-voltage detecting unit 10 that detects a direct-current voltage output to the load 11. The first capacitor 6a and the second capacitor 6b configure a charge accumulating unit that accumulates electric charges. Note that, in the example shown in FIG. 1, the reactor 3 is connected to the output side of the rectifier circuit 2. However, the reactor 3 can be connected to an input side of the rectifier circuit 2.

The rectifier circuit 2 is a three-phase full-wave rectifier circuit in which six rectifier diodes are full-bridge connected. In the example shown in FIG. 1, the power-supply-voltage detecting unit 9 detects line voltages of two phases (an r phase and an s phase) in the three-phase alternating current supplied from the alternating-current power supply 1.

The switching unit 7 includes a first switching element 4a that switches charging and non-charging of the second capacitor 6b, a second switching element 4b that switches charging and non-charging of the first capacitor 6a, a first backflow preventing element 5a that prevents a backflow to the first switching element 4a of electric charges charged in the first capacitor 6a, and a second backflow preventing element 5b that prevents a backflow to the second switching element 4b of electric charges charged in the second capacitor 6b.

A middle point of a series circuit including the first switching element 4a and the second switching element 4b and a middle point 200 of a series circuit including the first capacitor 6a and the second capacitor 6b are connected. The first capacitor 6a is connected to a collector of the first switching element 4a at a connection point 201. The first backflow preventing element 5a is connected in a forward direction toward the connection point 201 between the collector of the first switching element 4a and the connection point 201. The second capacitor 6b is connected to an emitter of the second switching element 4b at a connection point 202. The second backflow preventing element 5b is connected in a forward direction toward the emitter of the second switching element 4b between the emitter of the second switching element 4b and the connection point 202.

The capacities of the first capacitor 6a and the second capacitor 6b are the same. For the first switching element 4a and the second switching element 4b, for example, a semiconductor element such as a power transistor, a power MOSFET (Metal Oxide Semiconductor Field Effect Transistor), or an IGBT (Insulated Gate Bipolar Transistors) is used.

The control unit 8 controls (switching-controls) ON and OFF of the first switching element 4a and the second switching element 4b to thereby control a direct-current voltage supplied to the load 11. The switching control of the first switching element 4a and the second switching element 4b by the control unit 8 is explained with reference to FIGS. 1 to 3.

Figure 2:
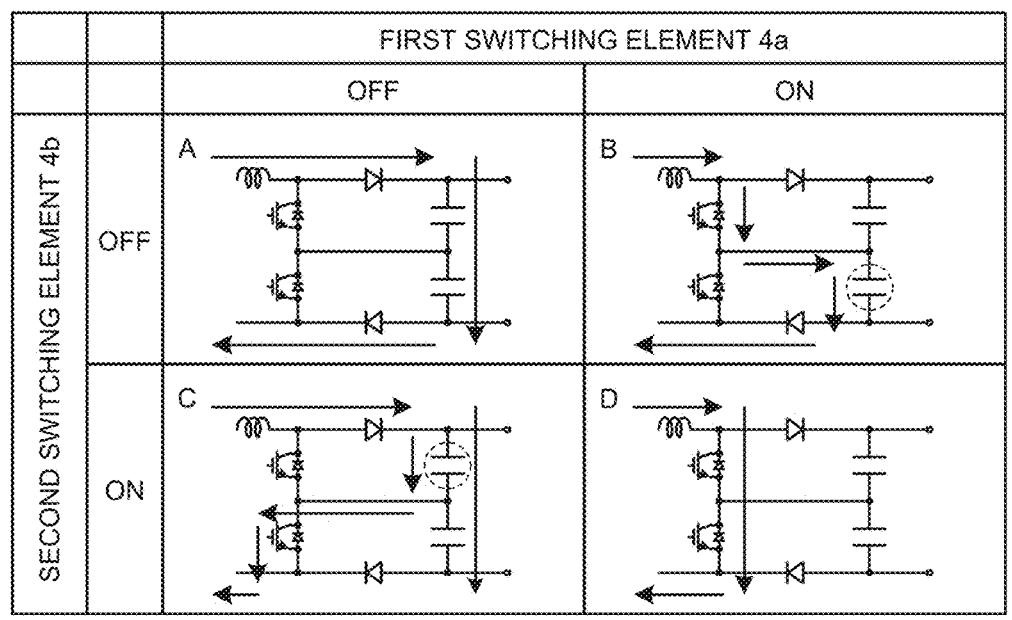
FIG. 2 is a diagram showing an example of a switching control state in the direct-current power supply device according to the first embodiment.

FIG. 2 is a diagram showing an example of a switching control state in the direct-current power supply device 100 of this embodiment. Note that, in FIG. 2, for simplification of the figure, signs of components are omitted.

A state A shown in FIG. 2 shows a state in which both of the first switching element 4a and the second switching element 4b are OFF-controlled (controlled to be OFF by the control unit 8). In this state, charging of the first capacitor 6a and the second capacitor 6b is performed.

A state B shown in FIG. 2 shows a state in which the first switching element 4a is ON-controlled (controlled to be ON by the control unit 8) and the second switching element 4b is OFF-controlled. In this state, charging of only the second capacitor 6b is performed.

A state C shown in FIG. 2 shows a state in which the second switching element 4b is ON-controlled and the first switching element 4a is OFF-controlled. In this state, only the first capacitor 6a is charged.

A state D shown in FIG. 2 shows a short-circuit state in which both of the two switching elements 4a and 4b are ON-controlled. In this state, charging of neither the first capacitor 6a nor the second capacitor 6b is performed.

In this embodiment, by switching the states shown in FIG. 2, a rush current in which an electric current flowing from the alternating-current power supply 1 steeply increases is suppressed while controlling the direct-current voltage supplied to the load 11.

Figure 3:
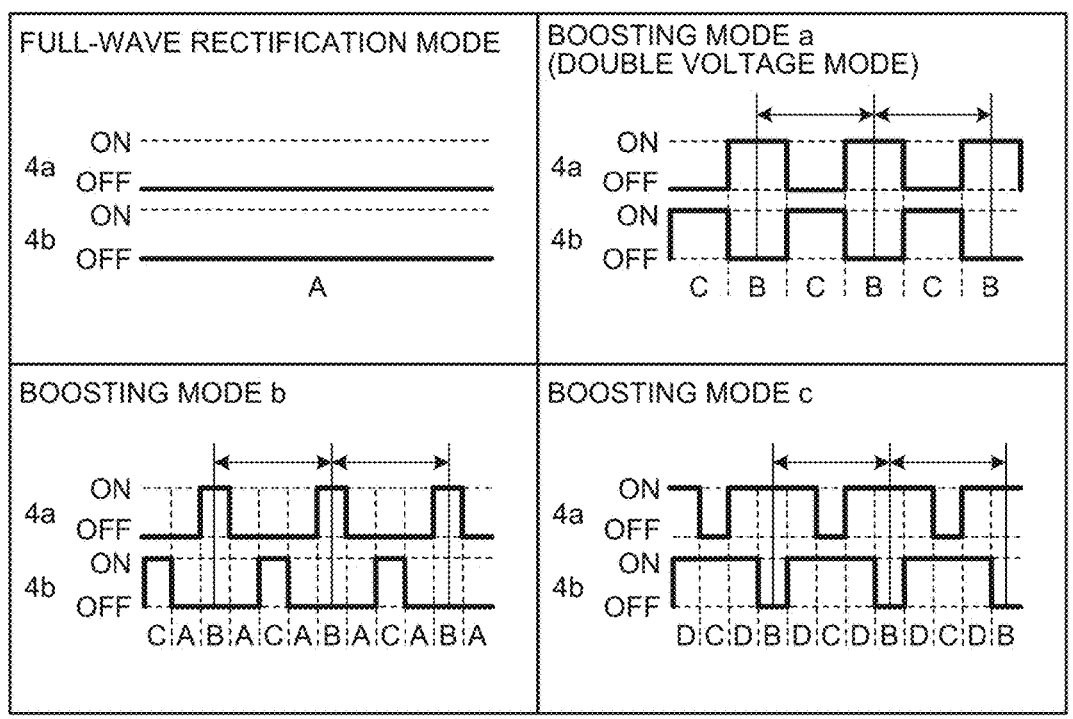
FIG. 3 is a diagram showing operation modes in the direct-current power supply device according to the first embodiment.

FIG. 3 is a diagram showing operation modes in the direct-current power supply device 100 of this embodiment. As shown in FIG. 3, the direct-current power supply device 100 of this embodiment has, as the operation modes, a full-wave rectification mode (a first mode) in which the first switching element 4a and the second switching element 4b are always set in an OFF control state and a boosting mode (a second mode) in which the first switching element 4a and the second switching element 4b are alternately ON-controlled.

As the boosting mode, there are three kinds of boosting modes; namely, a boosting mode "a", a boosting mode "b", and a boosting mode "c". In the boosting mode "a", both of on-duties of the first switching element 4a and the second switching element 4b are 50%. In the boosting mode "b", both of the on-duties of the first switching element 4a and the second switching element 4b are smaller than 50%. In the boosting mode "c", both of the on-duties of the first switching element 4a and the second switching element 4b is larger than 50%.

In the full-wave rectification mode, the first switching element 4a and the second switching element 4b are always set in the OFF control state (state A shown in FIG. 1). Therefore, a voltage full-wave-rectified by the rectifier circuit 2 becomes an output voltage of the direct-current power supply device 100.

In the boosting mode "a", ON timing of the first switching element 4a and OFF timing of the second switching element 4b are substantially simultaneous. OFF timing of the first switching element 4a and ON timing of the second switching element 4b are substantially simultaneous. Therefore, in the boosting mode "a", the state B and the state C shown in FIG. 2 are repeated. An output voltage at this point is approximately a double of the output voltage in the full-wave rectification mode. In this way, the boosting mode "a" is a double voltage mode in which the output voltage is approximately a double of the output voltage in the full-wave rectification mode.

In the boosting mode "b", a period in which one of the first switching element 4a and the second switching element 4b is ON and a simultaneous OFF period in which the both of the first switching element 4a and the second switching element 4b are OFF are provided. In the boosting mode "b", a state transition of the state B→the state A→the state C→the state A is cyclically repeated. An output voltage at this point is an intermediate voltage between the output voltage in the full-wave rectification mode and the output voltage in the boosting mode "a" (the double voltage mode).

In the boosting mode "c", a period in which one of the first switching element 4a and the second switching element 4b is ON and a period in which the both of the first switching element 4a and the second switching element 4b are ON are provided. In the boosting mode "c", a state transition of the state D→the state C→the state D→the state B is cyclically repeated. In the period in which both of the first switching element 4a and the second switching element 4b are ON (a period of the state D), energy is stored in the reactor 3. An output voltage at this point is a voltage equal to or larger than the output voltage in the boosting mode "a" (the double voltage mode).

In this way, in this embodiment, by changing the on-duties of the first switching element 4a and the second switching element 4b, it is made possible to control the direct-current voltage supplied to the load 11.

When an output voltage supplied by the boosting mode "a" is used as the output voltage, a start of an operation in the boosting mode "a" (the double voltage mode) is defined as a start of a switching operation. Before the start, the operation mode is the full-wave rectification mode in which the switching elements are always in the OFF control state. When the direct-current power supply device 100 starts the switching operation to operate in the boosting mode "a", an inrush current (a rush current) flows from the alternating-current power supply 1.

A mechanism of the flowing of the inrush current (the rush current) is explained. Before the start, a voltage detected by the direct-current-voltage detecting unit 10 is a direct-current voltage in the full-wave rectification mode (e.g., when a line voltage effective value of the alternating-current power supply 1 is represented as Vs, in the direct-current-voltage detecting unit 10, $\sqrt{2} \times Vs$). When the switching operation is started to start the operation in the boosting mode "a" from this state, the voltage detected by the direct-current-voltage detecting unit 10 is a direct-current voltage in a double voltage state (in the direct-current-voltage detecting unit 10, $\sqrt{2} \times Vs \times 2$), and thus, the direct-current voltage is a double of the direct-current voltage before the start.

Figure 4:
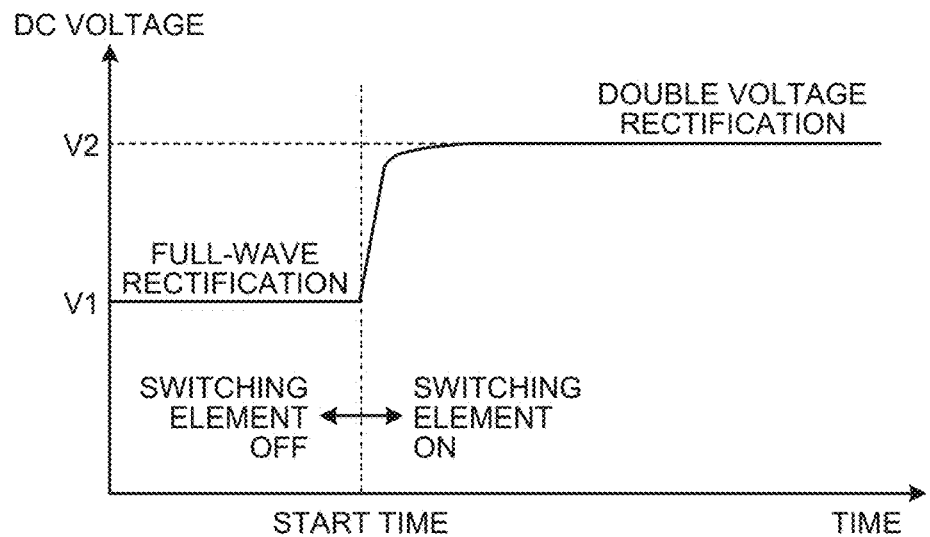
FIG. 4 is a diagram showing an example of a direct-current voltage before and after an operation is started in a boosting mode.

FIG. 4 is a diagram showing an example of a direct-current voltage before and after an operation is started in the boosting mode "a". Start time in FIG. 4 indicates the time when the switching elements change from OFF to ON, that is, the time of an operation start in the boosting mode "a". As shown in FIG. 4, the direct-current voltage suddenly rises from the start time and converges into a voltage in the double voltage state. Because the first capacitor 6a and the second capacitor 6b are connected in series, before the start, the capacitors 6a and 6b respectively share halves of a V1 voltage shown in FIG. 4. After the start, the first capacitor 6a and the second capacitor 6b alternately start charging. V1 is charged in the first capacitor 6a and V1 is charged in the second capacitor 6b, that is, a total of V1×2 (=V2) is charged in the capacitors. Therefore, an inrush current flows according to charging from V1/2 to V1 at this point.

To suppress the inrush current, it is conceivable to gradually charge the first capacitor 6a and the second capacitor 6b or increase the impedance of a current path during the charging to reduce the inrush current. However, when the impedance is increased, a loss increases because of the added impedance. In this embodiment, in order to suppress the inrush current without increasing the loss, the switching elements are controlled so as to gradually charge the first capacitor 6a and the second capacitor 6b.

Figure 5:
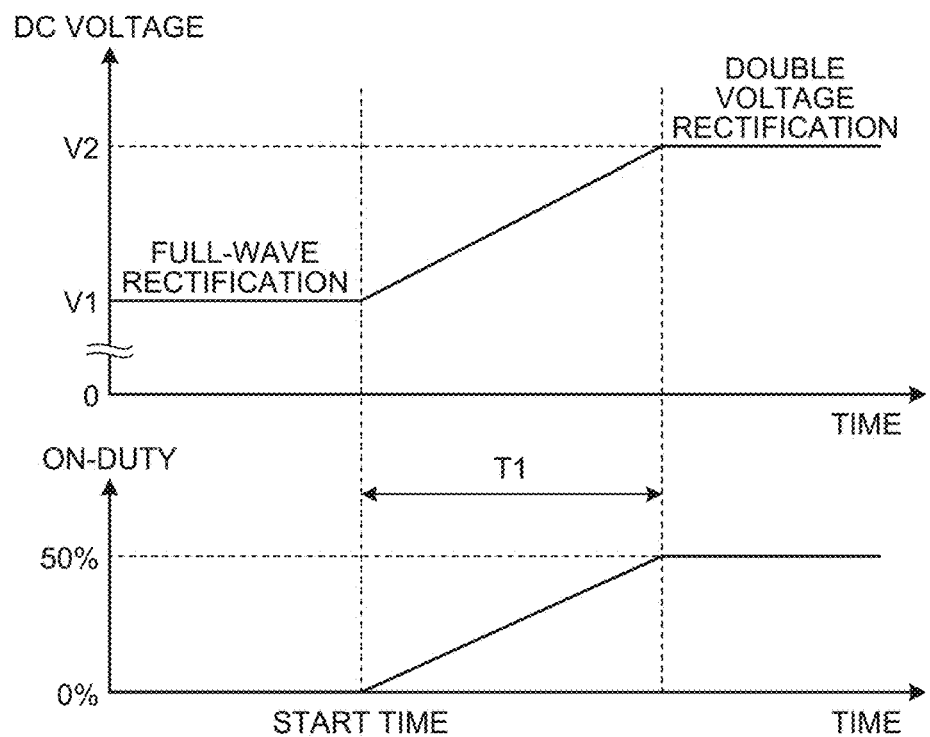
FIG. 5 is a diagram showing an example of changes in on-duty and the direct-current voltage during a shift from a full-wave rectification mode to the boosting mode.

When the first capacitor 6a and the second capacitor 6b are gradually charged, a method of gradually reducing on-duty to 50% as shown in FIG. 5 is conceivable. FIG. 5 is a diagram showing an example of changes in the on-duty and the direct-current voltage during a shift from the full-wave rectification mode to the boosting mode "a". As shown in FIG. 5, the on-duty is gradually increased (e.g., such that a time change ratio of the on-duty is fixed value or less). That is, the time of a change of the on-duty from 0% to 50% (hereinafter, a rising time of the on-duty (T1 in FIG. 5)) is increased (to be a fixed time or more). Note that, in the example shown in FIG. 5, the on-duty is controlled so as to linearly increase with a tilt of the on-duty (the time change ratio of the on-duty) fixed. However, a method of increasing the on-duty is not limited to this example. For example, the method can be an increasing method in which the rising time of the on-duty is divided into two and the tilt in the former half and that of the latter half are different from each other, or can be a method in which only the tilt at start time and the end time of the rising time (T1) of the on-duty are reduced and the tilt in the center is increased so as to form an S curve.

Note that the start time indicates the time at which the full-wave rectification mode is shifted to the boosting mode "a". However, when the on-duty is gradually increased, the start time indicates start time of a shift from the full-wave rectification mode to the boosting mode "a", that is, the start time of the rising time of the on-duty.

To suppress a peak of an input current, the on-duty only has to be gradually increased to 50%. However, in this method, a degree of freedom for the peak suppression is low. The degree of freedom of the peak suppression indicates a degree of freedom of a behavior of a result of suppressing the peak according to an output of the peak not only to suppress an instantaneous peak value but also to, for example, reduce not only the peak but also a cycle of occurrence of the peak even when the peak continues for a plurality of cycles. In this embodiment, during the start of the switching control, not only the on-duty is gradually increased to 50% but also a switching frequency is changed. Consequently, it is made possible to increase the degree of freedom of the peak suppression.

Note that, in the ON/OFF operation of the switching elements, when a combination of one ON period and one OFF period continuing from the ON period is represented as one cycle (operation cycle), the one cycle is a period shown by an arrow shown in FIG. 3. The one cycle is represented as Tr (seconds) and an inverse of Tr is defined as the switching frequency. In this embodiment, the inrush current is suppressed by controlling the switching frequency simultaneously with the on-duty.

Figure 6:
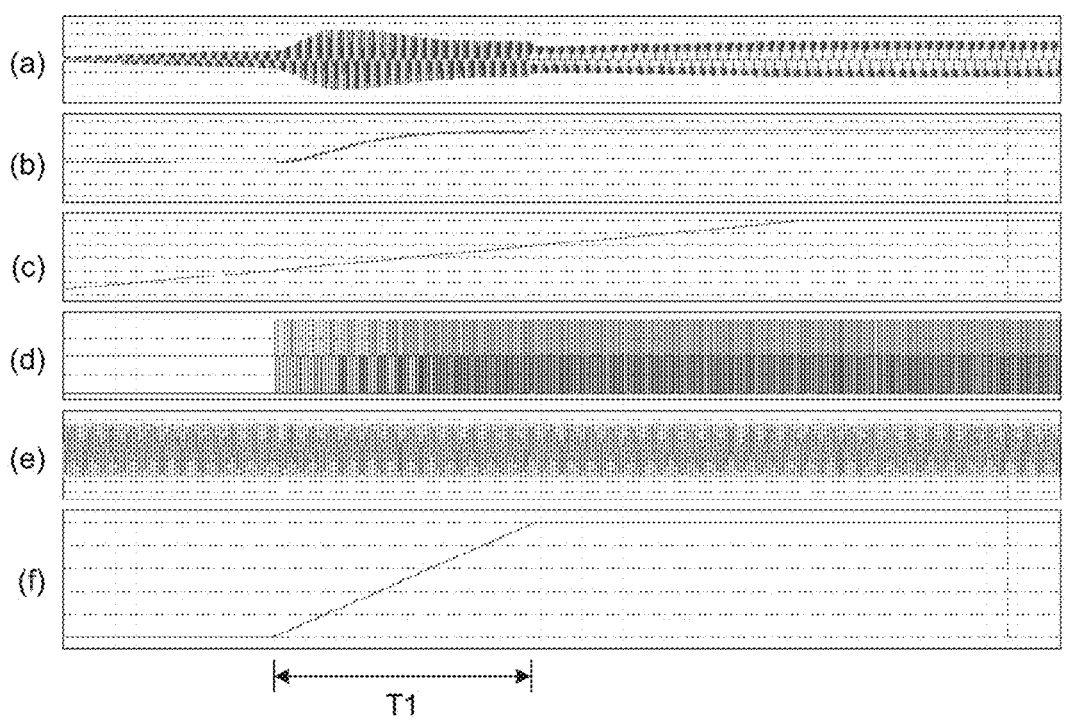
FIG. 6 is a diagram showing an example of operation waveforms indicating a simulation result of an operation for gradually increasing the on-duty during a start.

FIG. 6 is a diagram showing an example of operation waveforms indicating a simulation result of the operation for gradually increasing the on-duty during the start. FIG. 6 is a simulation result obtained when a simulation is carried out under a condition that the switching control for gradually increasing the on-duty to 50% as shown in FIG. 5 is performed. FIG. 6(a) is an input current (an input current flowing from the alternating-current power supply 1 to the rectifier 2). FIG. 6(b) is a direct-current voltage. FIG. 6(c) is input power (input power supplied from the alternating-current power supply 1). FIG. 6(d) is ON/OFF signals of the switching elements 4a and 4b. FIG. 6(e) is a triangular wave signal representing the switching frequency. FIG. 6(f) is the on-duty.

In FIG. 6, the switching frequency is a triple of a power supply cycle. The switching frequency is not changed before and after the start. In the case of the start by this method, the peak value of the input current increases as the on-duty increases. The peak of the input current decreases when the direct-current voltage (b) rises to a double voltage level. From this fact, it is seen that, while the direct-current voltage rises to the double voltage level, the peak of the input current increases because the inrush current from the alternating-current power supply 1 increases.

Figure 7:
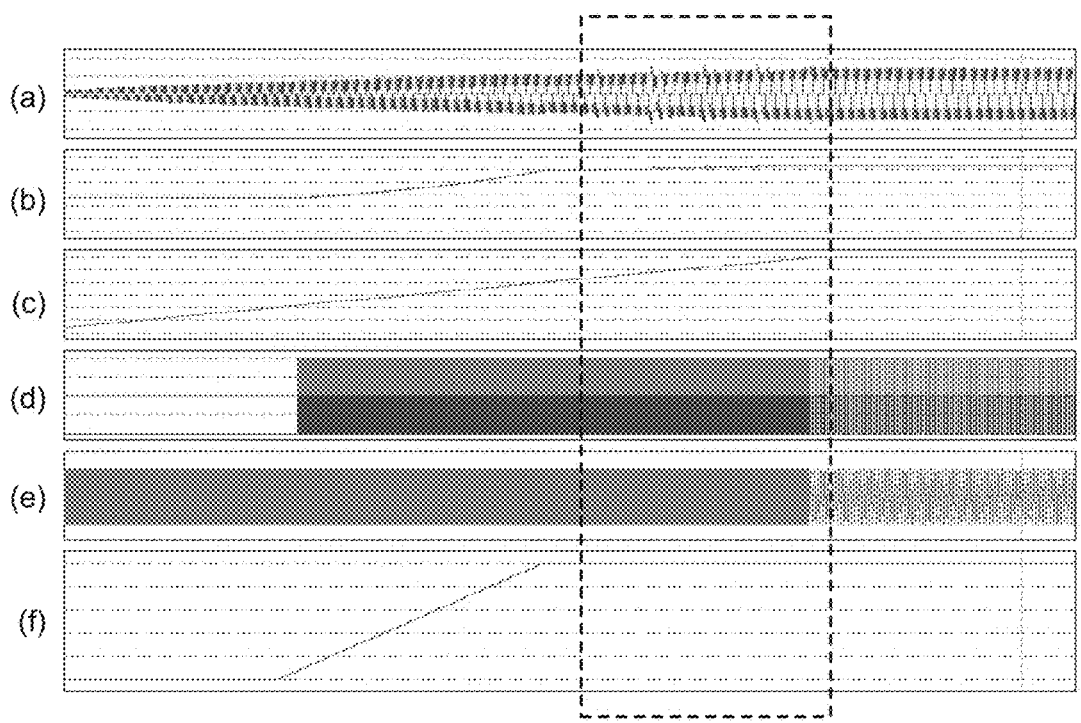
FIG. 7 is a diagram showing an example of operation waveforms indicating a simulation result of a change of a switching frequency during a start.

FIG. 7 is a diagram showing an example of operation waveforms obtained as a simulation result when the switching frequency is changed during the start. Like FIG. 6, FIG. 7 is an operation waveform chart showing a simulation result obtained when the on-duty is increased from 0% to 50% after the start and the switching frequency is reduced stepwise after the on-duty has increased to 50%. (a) to (f) of FIG. 7 indicate items same as the items of FIG. 6.

Figure 8:
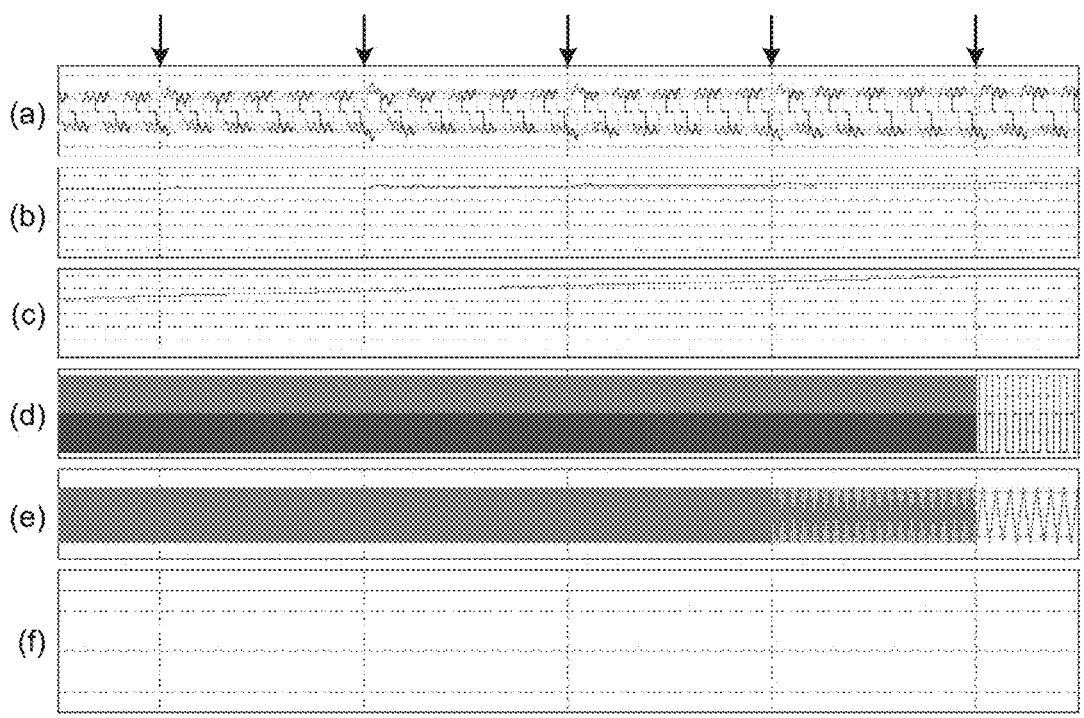
FIG. 8 is an enlarged waveform chart of a dotted line portion of FIG. 7.

FIG. 8 is an enlarged waveform chart of a dotted line portion of FIG. 7. The switching frequency is reduced at timings of arrows shown in FIG. 8. That is, as shown in FIG. 8, after the on-duty has increased to 50%, the switching frequency is induced in five stages. That is, the operation cycle is stepwise extended. Note that, in the simulation, the operation cycle is changed from 10 kHz to 8 kHz in the first arrow from the left in FIG. 8. Thereafter, the operation cycle is changed from 8 kHz to 5 kHz, 5 kHz to 3 kHz, 3 kHz to 1 kHz, and 1 kHz to a triple of the power supply cycle. The effect is not spoiled by the widths of the change. It goes without saying that the widths of the change are only an example.

When the switching frequency is high, a charging amount per time (e.g., a charging amount in one second) is not different from the charging amount in the case of a low switching frequency. However, a charging time in one charging decreases. This is synonymous with an increase in the number of cycles of alternate charging. Therefore, unlike the change in the on-duty for extending time, the equivalent increase in the charging cycle number leads to gradual charging. Therefore, as indicated by the simulation results of FIGS. 7 and 8, the inrush current can be suppressed.

Figure 9:
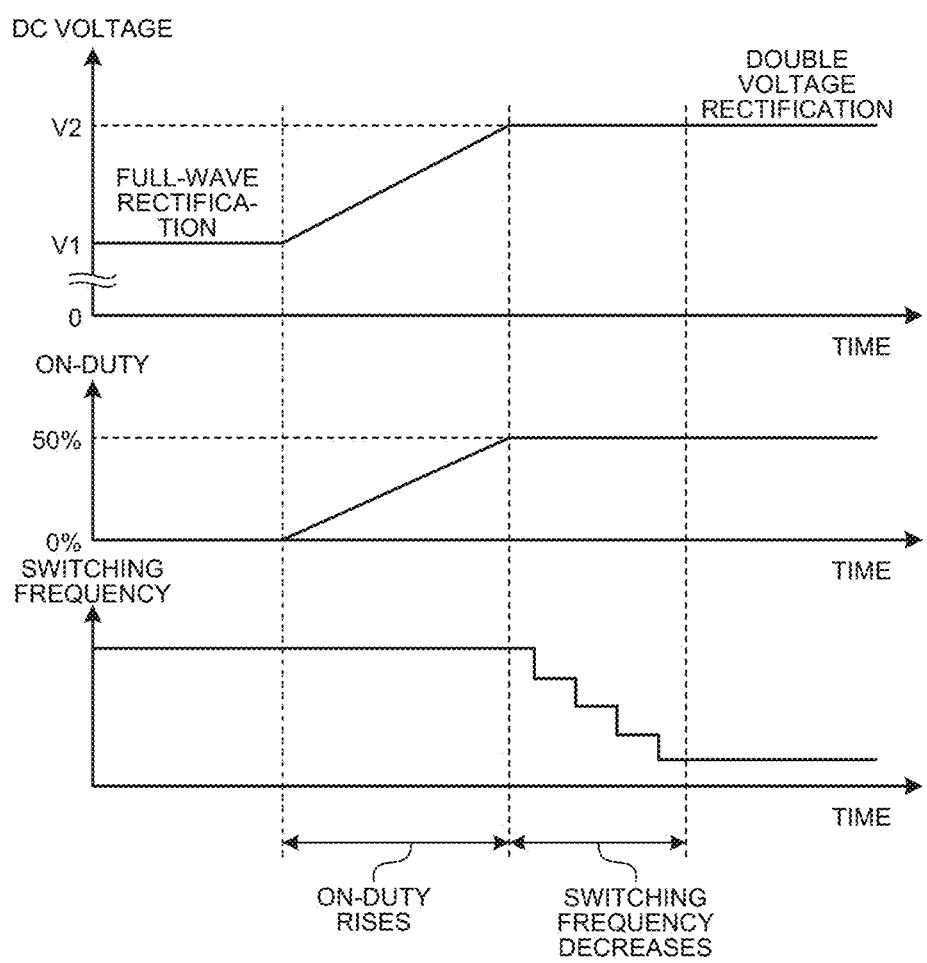
FIG. 9 is a schematic diagram of a state in which the switching frequency is reduced.

FIG. 9 is a schematic diagram of a state in which the switching frequency is decreased. As shown in FIG. 9, when the operation mode shifts from the full-wave rectification mode to the boosting mode "a", when the shift is started, first, the on-duty is increased from 0% to 50%. Thereafter, the switching frequency is stepwisely reduced.

As shown in FIG. 7 and FIG. 8, when the switching frequency is reduced, the input current slightly increases and the inrush current occurs. However, unlike FIG. 6, the input current does not considerably increase. From this fact, it is seen that the inrush current can be suppressed compared with the example shown in FIG. 6 in which the switching frequency is not reduced. Further, if the switching frequency is a higher frequency than the example shown in FIG. 7, the effect of the suppression of the inrush current by the gradual increase in the on-duty is larger than the effect in the example shown in FIG. 7, and the peak of the input current can be suppressed. In this way, by reducing the switching frequency after changing the on-duty, it is possible to suppress the inrush current of the input current.

According to FIG. 7, when the switching frequency is reduced, the input power is not a fixed value and increases. Therefore, the simulation shown in FIG. 7 indicates that the inrush current can be suppressed even at timing when the input power increases and indicates that the inrush current can be suppressed even during a load increase. In FIG. 7 and FIG. 8, the switching frequency is changed in the five stages. However, the number of stages for changing the switching frequency is not limited to five. The suppression effect of the inrush current is increased by increasing the number of changes. It is possible to reduce the inrush current to as close as zero by linearly changing the switching frequency itself and generating a triangular wave rather than changing the switching frequency stepwisely. For example, it is also possible to linearly change the switching frequency by changing, in every one cycle of the triangular wave, the switching frequency in a minimum unit in which the switching frequency can be generated. A method of reducing the switching frequency is not limited to these examples and can be a method of, for example, changing the switching frequency stepwisely after linearly changing the switching frequency. The method can be any method.

In this embodiment, during the shift from the full-wave rectification mode to the boosting mode "a", the switching frequency is reduced after the on-duty is changed. Therefore, it is possible to further suppress the inrush current compared with when only the on-duty is changed. In this embodiment, it is possible to suppress a loss of the switching elements by reducing the switching frequency compared with when the switching frequency is not reduced. Therefore, it is possible to suppress an increase in a loss of the switching elements and suppress the inrush current during the start. If the configuration and the operation of this embodiment are used even when the device is restarted after being stopped in a momentary stop or the like, it goes without saying that there is an equivalent effect that it is possible to suppress the inrush current during the restart.

In a steady state, that is, a state in which the switching elements are operated for a long time, a switching loss of the switching element 4a and the switching element 4b can be reduced and noise due to the switching can also be reduced as the switching frequency is lower. In this embodiment, the switching frequency is reduced after the on-duty is changed. Therefore, it is possible to reduce the switching loss and it is possible to provide a highly efficient direct-current power supply device.

The switching frequency in the steady state is desirably 1 kilohertz or less. However, when a wide band gap semiconductor is used as the switching element, the effect of this embodiment is not lost even if the switching frequency is not 1 kilohertz or less.

When the operation mode shifts from the full-wave rectification mode to the boosting mode "b" or the boosting mode "c", similarly, it is possible to suppress the inrush current by reducing the switching frequency after changing the on-duty.

Consequently, the direct-current power supply device according to this embodiment can boost, while maintaining the low-loss switching by the low-speed switching, the power supply voltage to the direct-current voltage twice as large as the power supply voltage and suppress the inrush current during the start for starting the operation of the switching elements.

Figure 10:
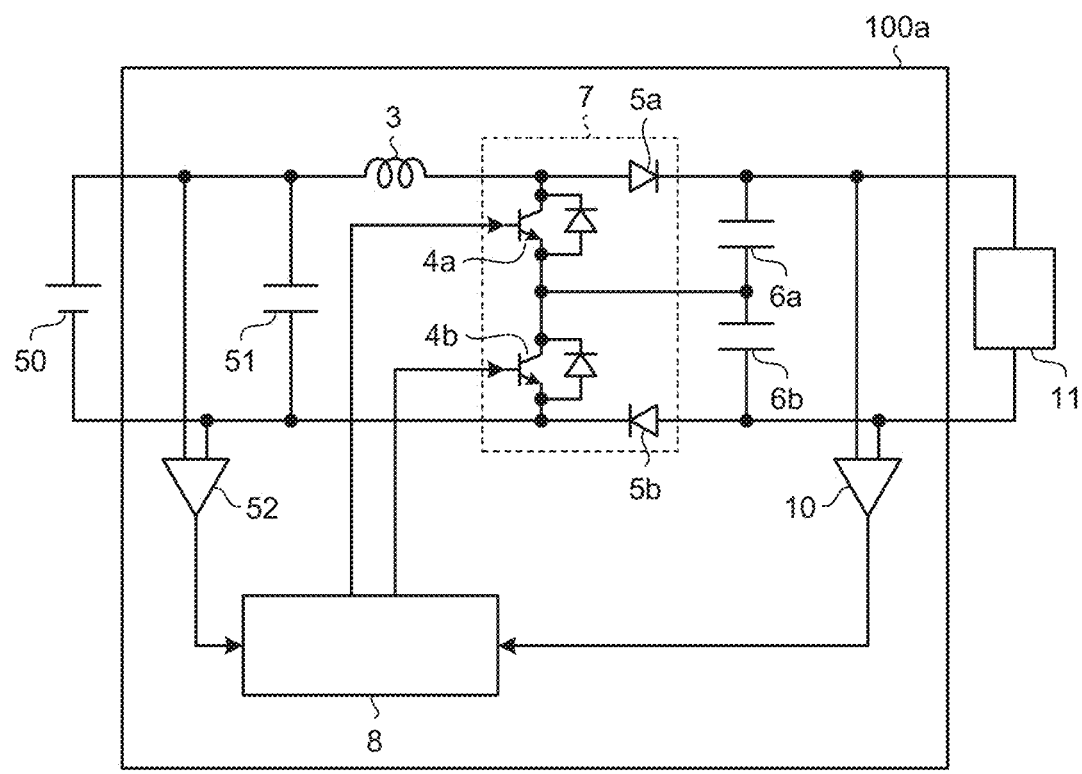
FIG. 10 is a diagram showing a configuration example of a direct-current power supply device according to a modification of the first embodiment.

Modifications of the direct-current power supply device according to this embodiment are explained. FIG. 10 is a diagram showing a configuration example of a direct-current power supply device 100a, which is a modification of the direct-current power supply device 100 shown in FIG. 1. Components having functions same as the functions shown in FIG. 1 are denoted by reference numerals and signs same as the reference numerals and signs shown in FIG. 1. Redundant explanation of the components is omitted. The three-phase alternating current is input to the direct-current power supply device 100 shown in FIG. 1 from the alternating-current power supply 1. However, a direct-current voltage is input to the direct-current power supply device 100a shown in FIG. 10 from a direct-current power supply 50. Like the direct-current power supply device 100 shown in FIG. 1, the direct-current power supply device 100a includes the reactor 3, the first capacitor 6a, the second capacitor 6b, the switching unit 7, the control unit 8, and the direct-current-voltage detecting unit 10. Further, the direct-current power supply device 100a includes a capacitor 51 that stores electric power of the direct-current power supply 50 and a power-supply-voltage detector 52 that detects a direct-current voltage of direct-current power supplied from the direct-current power supply 50.

The direct-current power supply 50 is a PV (Photo Voltaic) panel or a storage battery for solar power generation, a storage battery mounted on an electric automobile or a plug-in hybrid automobile, or the like. The direct-current power supply 50 can be a system power supply used when power transmission and power distribution by a direct current are realized in future.

In FIG. 1, the example is explained in which the three-phase alternating current is input. However, input electric power does not have to be the three-phase alternating current. Even when a direct-current voltage is input from the direct-current power supply 50 as shown in FIG. 10, like the direct-current power supply device 100 shown in FIG. 1, it is possible to suppress the inrush current. The output side of the rectifier 2 shown in FIG. 1 is a direct-current voltage. The output side of the rectifier 2 shown in FIG. 1 is equivalent to the input from the direct-current power supply 50 shown in FIG. 10. Therefore, it goes without saying that the inrush current suppression control during the start by the control unit 8 and the switching unit 7 in the configuration example shown in FIG. 1 can also be applied in the direct-current power supply device 100a shown in FIG. 10.

Figure 11:
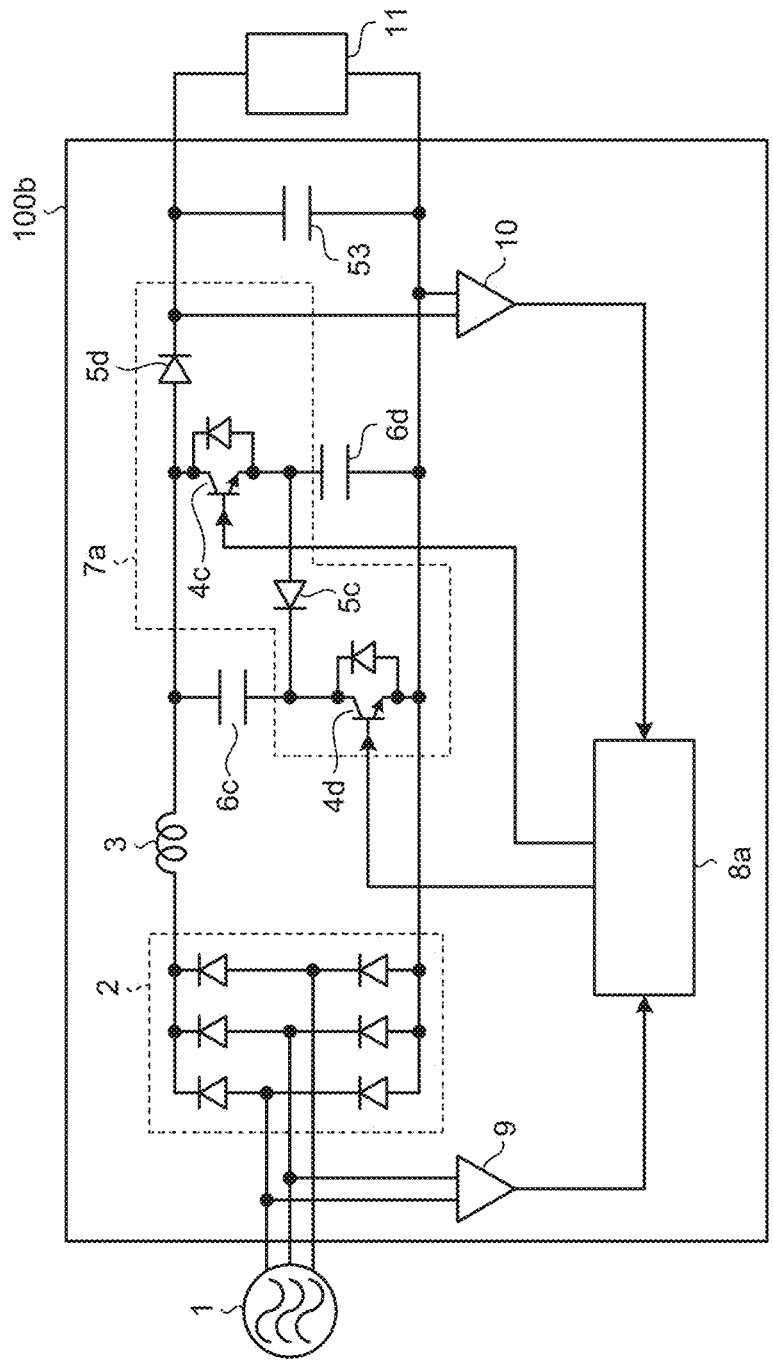
FIG. 11 is a diagram showing a configuration example of a direct-current power supply device according to a modification of the first embodiment.

FIG. 11 is a diagram showing a configuration example of a direct-current power supply device 100b, which is another modification. The direct-current power supply device 100b shown in FIG. 11 includes the rectifier circuit 2, the reactor 3, a switching unit 7a including a first switching element 4c and a second switching element 4d and backflow preventing elements 5c and 5d, a first capacitor 6d connected in series to the first switching element 4c, a second capacitor 6c connected in series to the second switching element 4d, a control unit 8a that controls the switching unit 7a, the power-supply-voltage detecting unit 9, the direct-current-voltage detecting unit 10, and a capacitor 53 connected in parallel to the switching unit 7a that charges an output from the switching unit 7a and stabilizes an output voltage.

The capacities of the first capacitor 6d and the second capacitor 6c are the same. For the first switching element 4c and the second switching element 4d, like the first switching element 4a and the second switching element 4b, a semiconductor element such as a power transistor, a power MOSFET, or an IGBT can be used.

The operation of the direct-current power supply device 100b is explained. When the second switching element 4d is turned off and the first switching element 4c is turned on, the first capacitor 6d is charged. When the first switching element 4c is turned off and the second switching element 4d is turned on, the second capacitor 6c is charged. Therefore, by alternately turning on the first switching element 4c and the second switching element 4d, it is possible to charge the first capacitor 6d and the second capacitor 6c. The control unit 8a performs charging of the first capacitor 6d and the second capacitor 6c by turning on the first switching element 4c or the second switching element 4d near a phase angle at which the power supply voltage, that is, the direct-current voltage supplied from the direct-current power supply 50 is a peak voltage. Note that, at this point, a backflow from the capacitor 53 can be prevented by the second backflow preventing element 5d. By charging the first capacitor 6d and the second capacitor 6c near the phase angle at which the power supply voltage is the peak voltage, if the peak voltage of the direct-current power supply 50 is set to V1, a state same as the full-wave rectification shown in FIG. 4 is obtained by turning on the first switching element 4c and the second switching element 4d.

When the first switching element 4c and the second switching element 4d are turned off, electric charges are discharged from the first capacitor 6d and the second capacitor 6c. When the first switching element 4c and the second switching element 4d are turned off, the first capacitor 6d and the second capacitor 6c are connected in series via the backflow preventing element 5c. As a result, a voltage obtained by adding up the voltage of the first capacitor 6d and the voltage of the second capacitor 6c, that is, a voltage same as the double voltage rectification V2 shown in FIG. 4 is applied to the capacitor 53.

It is generally known that electric charges move from high potential to low potential. Therefore, in the direct-current power supply device 100b, a backflow is prevented by the diode 5d. If the first switching element 4c and the second switching element 4d are simultaneously turned on, a short circuit state, that is, a state same as the state of D in FIG. 2 can be realized.

In FIG. 1, the configuration in which the switching elements are connected in series is shown. However, an operation same as the operation of the configuration shown in FIG. 1 can also be performed by a configuration in which the switching elements and the capacitors connected in series are connected in parallel, in other words, the switching elements are connected in parallel as shown in FIG. 11. In the direct-current power supply device 100b shown in FIG. 11, if a mode in which the first switching element 4c and the second switching element 4d are turned off is set as the first mode, the on-duty is longer in the second mode in which a state in which the second switching element 4d is turned on and the first switching element 4c is turned off and a state in which the second switching element 4d is turned off and the first switching element 4c is turned on are alternately repeated. Therefore, when the control unit 8a shifts to the mode in which the on-duty is longer, by performing control for reducing the switching frequency after changing the on-duty, as in the case of the configuration example shown in FIG. 1, it is made possible to obtain the effects of this embodiment explained above.

Second Embodiment

Figure 12:
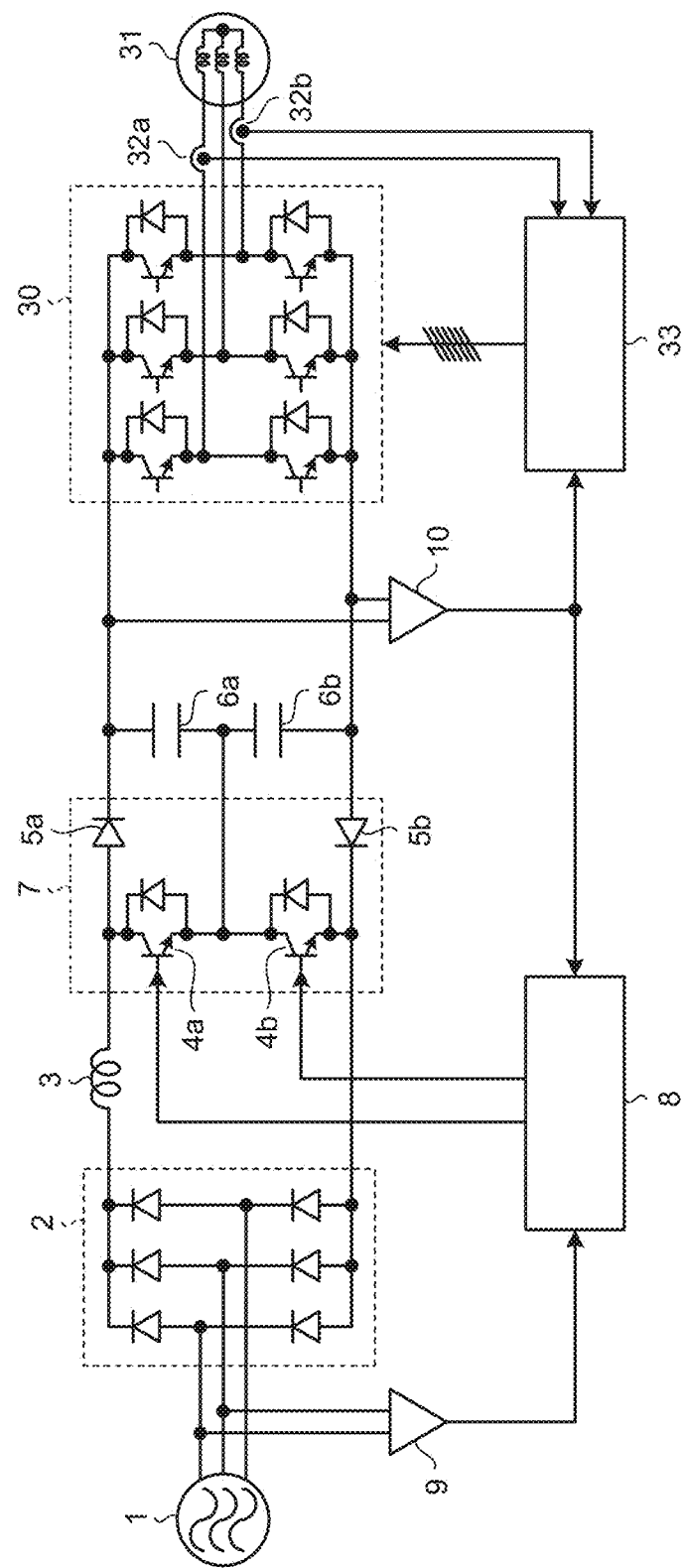
FIG. 12 is a circuit block diagram showing a configuration example of a motor driving device according to a second embodiment.

FIG. 12 is a circuit block diagram showing a configuration example of a motor driving device according to a second embodiment of the present invention. In FIG. 12, components performing operations same as the operations in the circuit configuration shown in FIG. 1 are denoted by reference numerals and signs same as the reference numerals and signs in the first embodiment. Redundant explanation of the components is omitted. The motor driving device shown in FIG. 12 includes the direct-current power supply device 100 according to the first embodiment. The load 11 shown in FIG. 1 corresponds to an inverter 30 and an electric motor 31 shown in FIG. 12. The inverter 30 is connected to both ends of a series circuit configured by the first capacitor 6a and the second capacitor 6b. A direct-current voltage is input to the inverter 30.

The motor driving device according to this embodiment includes a current detector 32 (32a, 32b) and a driving control unit 33 in addition to the direct-current power supply device 100 according to the first embodiment. The current detector 32 detects an electric current flowing to the electric motor 31. The driving control unit 33 controls the inverter 30 on the basis of an electric current detected by the current detector 32 and a direct-current voltage detected by the direct-current-voltage detecting unit 10.

The electric motor 31 is controlled to be driven by the inverter 30. Therefore, a driving operation range of the electric motor 31 changes according to a direct-current voltage input to the inverter 30. In particular, when the electric motor 31 is an electric motor in which a permanent magnet is used in a rotor, a direct current of the electric motor 31 also affects a magnetic characteristic of the permanent magnet used in the rotor.

A permanent magnet motor in which, for example, a rare-earth magnet having strong magnetism is used as the material of a permanent magnet is applied. Torque is generated with a small electric current because the rare-earth magnet has strong magnetism. Therefore, the rare-earth magnet is applied to the electric motor 31 used in an apparatus in which energy saving is requested. However, because the material of the rare-earth magnet is rare metal called rare earth, it is difficult to acquire the rare-earth magnet. In a permanent magnet motor in which the rare-earth magnet is not used and a magnet such as ferrite magnet having weaker magnetism than the rare-earth magnet is used, at the same electric current, output torque is small compared with when the rare-earth magnet is used. Therefore, in the permanent magnet motor including the magnet such as ferrite having weak magnetism, an electric current is increased by a decreased amount in the magnet magnetism to supplement the torque. Alternatively, because the output torque is proportional to an electric current×the number of windings of a wire, the number of windings is increased to supplement the output torque without increasing the electric current. When the electric current is increased, a copper loss of the electric motor 31 and a conduction loss in the inverter 30 increase.

When the number of windings is increased without increasing the electric current to avoid the increase in the losses, an induced voltage corresponding to the number of revolutions of the electric motor 31 increases. The inverter 30 needs a direct-current voltage higher than the induced voltage. Therefore, when the number of windings is increased, it is necessary to increase the direct-current voltage.

Therefore, in this embodiment, in the motor driving device, the direct-current power supply device 100 explained in the first embodiment is used as the direct-current power supply device that supplies electric power to the inverter 30 that drives the electric motor 31. Consequently, it is made possible to supply plural kinds of direct-current voltages such as the full-wave rectification state, the double voltage rectification state, and the like to the inverter 30. Therefore, when an electric motor in which the number of windings is increased without using the rare-earth magnet is used as the electric motor 31, it is possible to supply a direct-current voltage suitable for the electric motor 31. Therefore, it is possible to drive the electric motor 31 without increasing a loss of the electric motor 31 in which the rare-earth magnet is not used.

By using the direct-current power supply device 100 according to the first embodiment, an appropriate voltage is applied to the electric motor 31 in accordance with an operation state (a load amount) of the electric motor 31, and thus, a driving operation with high efficiency is made possible. Specifically, the driving control unit 33 grasps an operation state of the electric motor 31 on the basis of an electric current detected by the current detector 32 and indicates a voltage to the control unit 8 on the basis of the operation state. The control unit 8 selects a mode (the full-wave rectification mode, the boosting mode "a", the boosting mode "b", or the boosting mode "c") of the switching unit 7 so as to set a voltage to the indicated voltage and operates the switching unit 7 in the selected mode.

In particular, in the electric motor 31 in which the magnet such as ferrite magnet having small magnetism compared with rare earth magnet is used, because an appropriate voltage is applied in accordance with an operation state, it is made possible to suppress an increase in a loss and realize a driving operation with high efficiency. Therefore, the direct-current power supply device 100 is suitable as a direct-current power supply device for an inverter that drives the permanent magnet motor of ferrite magnet or the like.

Further, a MOSFET called "MOSFET of a super junction structure" is used in one or more of the elements (the first switching element 4a, the second switching element 4b, the first backflow preventing element 5a, the second backflow preventing element 5b, and the rectifier element configuring the rectifier circuit 2) constituting the direct-current power supply device according to this embodiment and the switching elements of the inverter 30. Consequently, it is made possible to realize a further reduction in a loss, and thus it is also made possible to provide a highly efficient direct-current power supply device. Note that the super junction structure is a structure having a P layer deeper than a normal MOSFET, and it is known that the deep P layer is in widely contact with an n layer, thereby having high voltage resistance while having low on resistance.

It goes without saying that it is possible to provide the direct-current power supply device having a lower loss even when at least one of the elements configuring the direct-current power supply device according to this embodiment and the switching elements of the inverter 30 is formed by a wide band gap semiconductor such as GaN (gallium nitride), SiC (silicon carbide), and diamond. Further, the voltage resistance increases and allowable current density also increases because the wide band gap semiconductor is used. Therefore, it is possible to reduce the size of the MOSFET. It is possible to reduce the size of a semiconductor module incorporating these elements. Because heat resistance is also high, it is also possible to reduce the size of heat radiation fins of a heat sink. Further, the wide band gap semiconductor has a higher withstand voltage than the conventional silicon (Si) semiconductor and dominantly acts on an increase in a voltage. Therefore, by configuring the direct-current power supply device or the inverter 30 having a low loss and a high voltage, it is made possible to further derive characteristics of the wide band gap semiconductor.

As explained above, in this embodiment, the example is explained in which the direct-current power supply device 100 according to the first embodiment is applied to the motor driving device. In the motor driving device according to this embodiment, it is possible to appropriately control, according to the configuration (the type of the permanent magnet, the number of windings, etc.) and an operation state of the electric motor 31, a voltage supplied to the inverter 30 that controls to drive the electric motor 31. Consequently, even when the electric motor 31 including the magnet such as ferrite magnet having small magnetism compared with the rare-earth magnet is controlled to be driven, it is possible to suppress a loss and realize an efficient driving operation. Further, as explained in the first embodiment, it is possible to suppress the inrush current.

Third Embodiment

Figure 13:
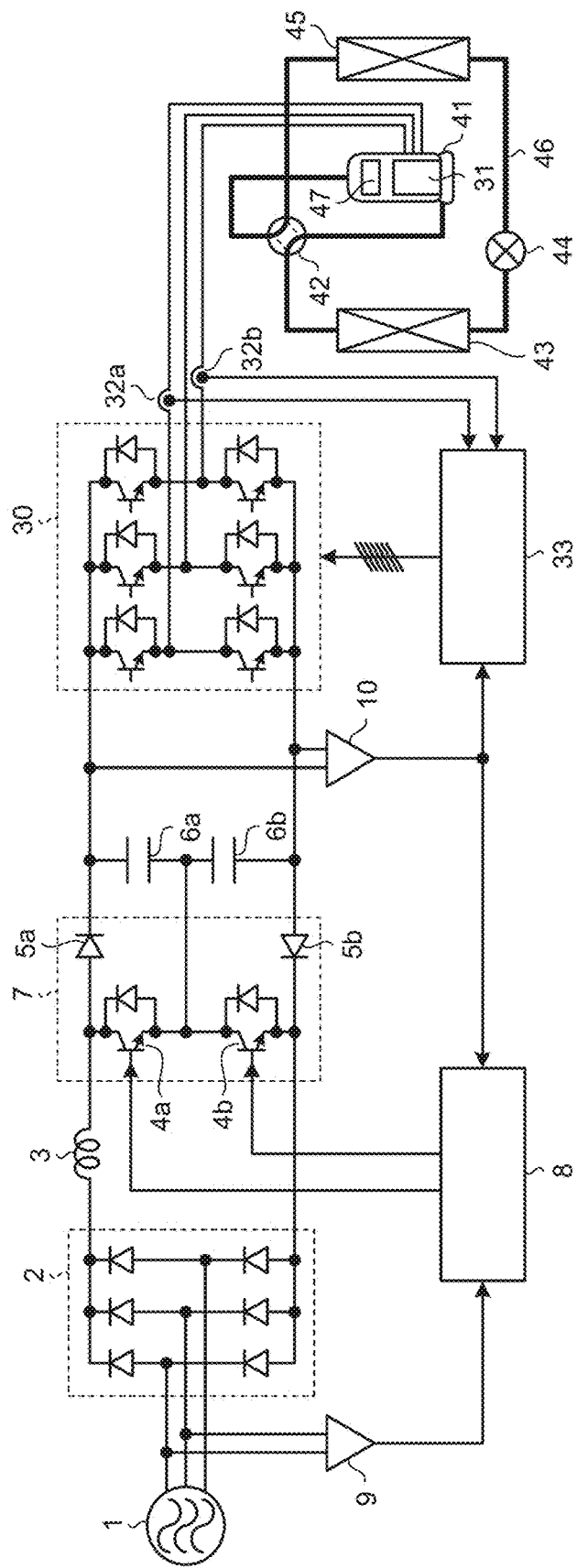
FIG. 13 is a circuit block diagram showing a configuration example of an air conditioner according to a third embodiment.

FIG. 13 is a circuit block diagram showing a configuration example of an air conditioner according to a third embodiment of the present invention. The air conditioner according to this embodiment includes the motor driving device explained in the second embodiment. The air conditioner according to this embodiment includes a refrigeration cycle to which a compressor 41 incorporating the electric motor 31 in the second embodiment, a four-way valve 42, an outdoor heat exchanger 43, an expansion valve 44, and an indoor heat exchanger 45 are attached via a refrigerant pipe 46, so as to constitute a separate type air conditioner.

A compressing mechanism 47 that compresses a refrigerant and the electric motor 31 that operates the compressing mechanism 47 are provided inside the compressor 41. The refrigerant circulates between the heat exchangers 43 and 45 from the compressor 41, whereby the refrigeration cycle that performs cooling and heating and the like is established. The circuit block shown in FIG. 13 can be applied to not only the air conditioner but also apparatuses including the refrigeration cycle such as a refrigerator and a freezer.

With the refrigeration cycle, the air conditioner that performs cooling and heating changes to a stable state when a room temperature approaches a set room temperature preset by a user. The inverter 30 operates to rotate the electric motor 31 mounted on the compressor 41 at low speed. Therefore, because the low speed rotation is continued for a long time in the air conditioner, efficiency improvement during the low-speed operation considerably contributes to energy saving. Consequently, when an electric motor including a rare-earth magnet or a permanent magnet with an increased number of windings and weak magnetism for reducing an electric current is used for the electric motor 31, the electric motor contributes to energy saving.

As explained in the second embodiment, the air conditioner according to this embodiment can efficiently control to drive the electric motor 31 including a permanent magnet with an increased number of windings and weak magnetism, even if a rare-earth magnet, which is rare metal, is not used. Therefore, when the electric motor 31 including the permanent magnet with the increased number of windings and the weak magnetism is used, it is also possible to realize energy saving.

In particular, when the motor driving device according to the second embodiment is applied to an apparatus that always operates for twenty-four hours like a refrigerator, because operation in a low-current state in low-speed rotation is long, it is possible to realize energy saving at low costs with the electric motor 31 to which a ferrite magnet or the like with an increased number of windings is applied.

INDUSTRIAL APPLICABILITY

As explained above, the direct-current power supply device according to the present invention can be used in a power supply device for a load that performs power consumption with a direct current, and can be used particularly as a power supply device for an inverter that requires a direct-current power supply device. Besides realization of energy saving through application to an inverter that drives a permanent magnet motor, it is possible to configure an inexpensive motor driving device with a high energy saving property without using a rare-earth magnet, which is rare metal. Therefore, the direct-current power supply device can also be applied to domestic electric appliances in general such as a refrigerator, a dehumidifier, a heat-pump type water heater, a showcase, and a vacuum cleaner besides an air conditioner, a freezer, and a washer drier. The direct-current power supply device can also be applied to a fan motor, a ventilation fan, a hand drier, an electromagnetic induction heating cooker, and the like.

The invention claimed is:

1. A direct-current power supply device that converts a first voltage that is an input voltage into a second voltage that is an output voltage, comprising:

a first switching element and a second switching element wherein, when transitioning an operation mode from a first mode in which on-duty of the first switching element and the second switching element is a first value to a second mode in which the on-duty of the first switching element and the second switching element is a second value larger than the first value, the on-duty is changed from the first value to the second value, taking equal to or longer time than a first time and after the on-duty reaches the second value, an operation cycle of the first switching element and the second switching element is extended in a stepwise manner to be longer than an operation cycle in the first mode while the on-duty is maintained at the second value.

2. The direct-current power supply device according to claim 1, further comprising:

a charge storage unit including a first capacitor and a second capacitor, and a switching unit that switches the first mode and the second mode, wherein the switching unit includes a backflow preventing element that suppresses a backflow of charges from the charge storage unit, and a middle point between the first switching element and the second switching element and a middle point between the first capacitor and the second capacitor are connected.

3. The direct-current power supply device according to claim 2, wherein the backflow preventing element is formed by a wide band gap semiconductor.

4. The direct-current power supply device according to claim 3, wherein the wide band gap semiconductor is silicon carbide, a gallium nitride-based material, or diamond.

5. The direct-current power supply device according to claim 1, further comprising:

a charge storage unit including a first capacitor and a second capacitor, and a switching unit that switches the first mode and the second mode, wherein the switching unit includes a backflow preventing element that suppresses a backflow of charges from the charge storage unit, and a middle point between the first switching element and the second capacitor and a middle point between the first capacitor and the second switching element are connected via a diode.

6. The direct-current power supply device according to claim 5, wherein the backflow preventing element is formed by a wide band gap semiconductor.

7. The direct-current power supply device according to claim 6, wherein the wide band gap semiconductor is silicon carbide, a gallium nitride-based material, or diamond.

8. The direct-current power supply device according to claim 1, wherein the first value is 0% and the second value is 50%.

9. The direct-current power supply device according to claim 1, wherein at least one of the first switching element or the second switching element is formed by a wide band gap semiconductor.

10. The direct-current power supply device according to claim 1, further comprising a rectifier circuit connected to an alternating-current power supply, wherein a rectifier element constituting the rectifier circuit is formed by a wide band gap semiconductor.

11. A motor driving device that drives an electric motor, the motor driving device comprising:

the direct-current power supply device according to claim 1;

an inverter that controls the electric motor using a direct current supplied from the direct-current power supply device;

a current detecting unit that detects an electric current flowing to the electric motor; and a driving control unit that controls the inverter on the basis of the electric current detected by the current detecting unit.

12. The motor driving device according to claim 11, wherein the driving control unit determines, on the basis of a load amount of the electric motor, a voltage of the direct current to be supplied to the inverter and indicates the determined voltage to the direct-current power supply device, and the direct-current power supply device controls, on the basis of the indication from the driving control unit, the voltage of the direct current to be supplied to the inverter.

13. The motor driving device according to claim 11, wherein the electric motor includes a permanent magnet composed of a material other than a rare-earth element.

14. The motor driving device according to claim 11, wherein switching elements constituting the inverter are each formed by a wide band gap semiconductor.

15. The motor driving device according to claim 14, wherein the wide band gap semiconductor is silicon carbide, a gallium nitride-based material, or diamond.

16. An air conditioner comprising:

the motor driving device according to claim 11; and a compressor including an electric motor driven by the motor driving device.

17. A refrigerator comprising:

the motor driving device according to claim 11; and a compressor including an electric motor driven by the motor driving device.

18. The direct-current power supply device according to claim 1, wherein the operation cycle of the first switching element and the second switching element is changed in a linear manner prior to being extended in a stepwise manner.

* * * * *